Jan. 7, 1941.  C. S. HAZARD  2,227,830
AUTOMATIC CUT-OFF FOR DISPENSING PUMPS
Filed May 5, 1936
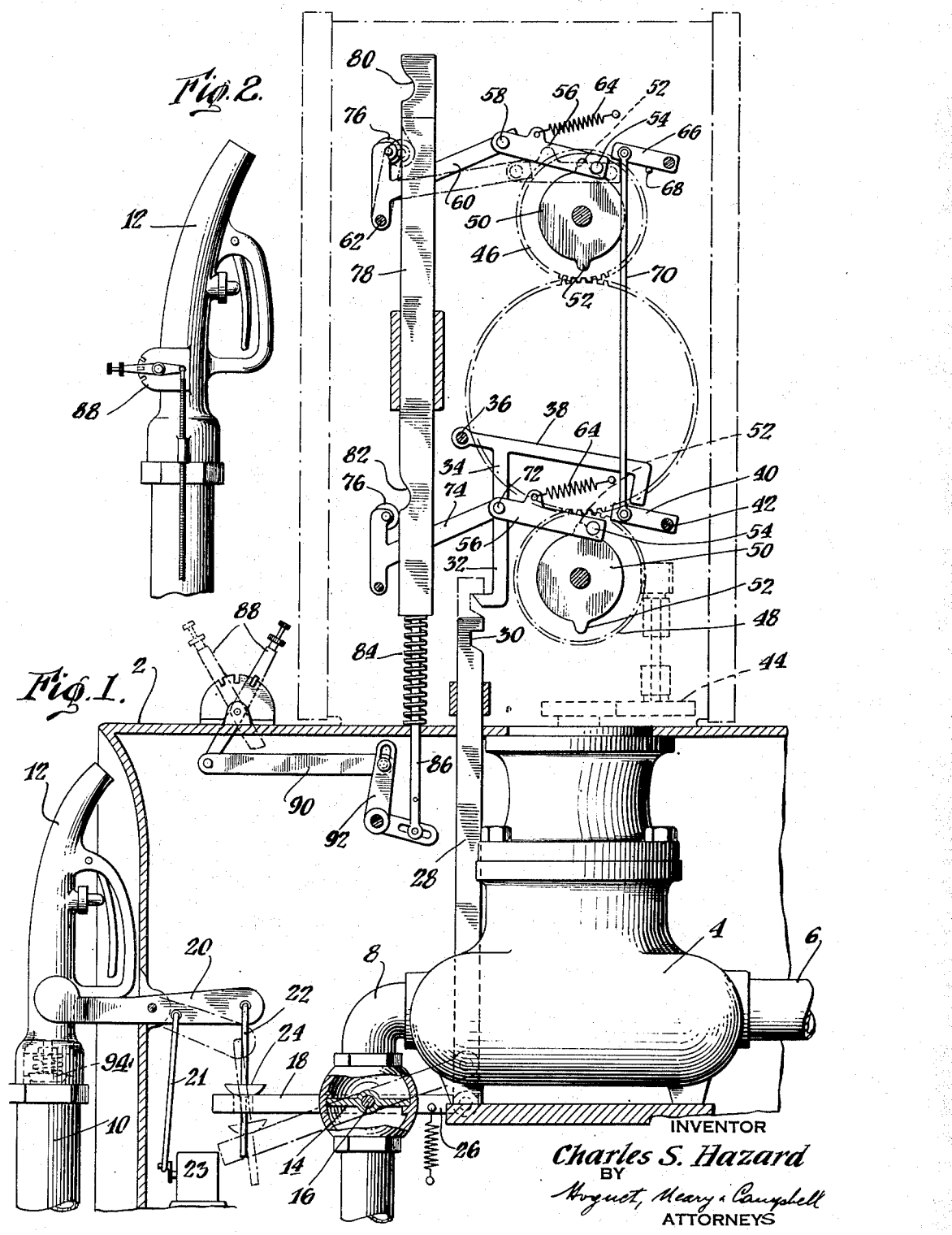
INVENTOR
Charles S. Hazard
BY
ATTORNEYS Patented Jan. 7, 1941

2,227,830

UNITED STATES PATENT OFFICE 2,227,830

AUTOMATIC CUT-OFF FOR DISPENSING PUMPS

Charles S. Hazard, New York, N. Y., assignor to Neptune Meter Company, a corporation of New Jersey Application May 5, 1936, Serial No. 77,959

4 Claims. (Cl. 221—101)

This invention relates to valve operated mechanism for dispensing pumps and similar constructions wherein a valve is actuated to terminate the flow of liquid upon delivery of a predetermined amount thereof.

The present invention is particularly applicable to devices having registering means for indicating both the volume and the cost of the liquid dispensed and includes predetermining means for terminating the flow of liquid when the amount delivered has either a given volume or a given cost. One of the advantages of the present invention resides in the selective nature thereof which enables the unit of measure employed in determining the operation of the valve to be varied at will. Deliveries can thus be made and the operation terminated when the amount of liquid dispensed has either a predetermined volume or a predetermined cost.

The construction employed in any particular case may be varied considerably but as hereinafter described the invention may be employed in combination with registering mechanism to actuate the valve and close the same when the desired delivery has been made whereas other means are employed for actuating the valve to permit the delivery of liquid in initiating a dispensing operation or when the predetermining means is not employed.

One of the objects of the invention is to provide novel means for actuating a cut off valve of a dispensing pump which means are selectively operable in response to the operation of alternative elements of a registering device.

Another object of the invention is to provide means controlled by operations incidental to the dispensing of liquid from a dispensing pump for controlling a cut off valve.

These and other objects and features of the invention will appear from the following description thereof in which reference is made to the accompanying figures of the drawing wherein:

Fig. 1 is a vertical sectional view of a portion of a dispensing pump and register having a typical form of the invention applied thereto, and Fig. 2 is an elevation of a hose nozzle illustrating an alternative arrangement of certain elements of the construction of Fig. 1.

That form of the invention chosen for purposes of illustration is embodied in a dispensing pump having a casing 2 within which is housed a meter 4 which receives liquid from a suitable source, such as a motor driven pump, through the conduit 6 and is provided with an outlet conduit 8 through which the liquid dispensed passes to a dispensing hose 10 provided with a nozzle 12. A cut off valve 14 is disposed between the meter 4 and the nozzle 12 and as illustrated may be in the form of a spring loaded butterfly valve secured to a spindle 16 and operated by means of an operating arm 18. The valve 14 normally tends to remain closed but is adapted to be opened before a dispensing operation is initiated by means of a lever 20 pivotally mounted on the housing 2 and provided with a portion extending outwardly from the housing to serve as a support for the hose nozzle 12. The inner end of the lever 20 is provided with a downwardly extending rod 22 passing through an opening in the arm 18 and provided with a stop member 24 for engaging the operating arm to depress the end thereof and open the valve when the outer end of pivoted lever 20 is raised in starting a dispensing operation. A link 21 is also connected to the inner end of lever 20 and is connected to a switch 23 to close the same and actuate a motor driven pump or other liquid flow producing means. The rod 22 is freely movable with respect to the operating arm 18 when the outer end of lever 20 is depressed and the inner end raised to actuate switch 23 for stopping the delivery of liquid.

Upon rocking movement of the operating arm 18 to open the valve 14, the inner end 26 of the arm is raised to the dotted line position shown, thereby raising a latch bar 28, the upper end of which is provided with a recess 30. When raised the latch bar is engaged by a pivoted latch 32 carried by link 34 mounted on the register housing at 36. A projecting arm 38 is carried by the link 34 and extends into position above a tripping member 40 pivotally mounted at 42 and movable into raised position upon predetermined movement of an element of the register. The bar 28 and end 26 of the operating arm 18 are thus held in raised position by the latch 32 and the valve is held open until released by movement of the latch carrying link 34 about its pivot in response to operation of one or another of the elements of the registering mechanism. When the predetermining elements of the mechanism are not used, the latch 32 remains in engagement with the bar 28 and valve 14 is held open continuously so that the dispensing of liquid can take place in the conventional manner.

The registering mechanism shown is driven by the meter 4 through suitable means such as the gears 44 to actuate the same in response to the delivery of liquid by the device. The register embodies two sets of numeral wheels or other rotatable indicating means 46 and 48, the upper indicator 46 of the register being operable to indicate the cost of the liquid dispensed, whereas the lower indicator 48 of the register is operable to indicate the volume of liquid dispensed. The indicators 46 and 48 are interconnected in any suitable way to cause the same to be driven in predetermined relation so that as the meter 4 is operated each of the indicators 46 and 48 is advanced by rotation in a clockwise direction, as shown in the drawing.

Each of the indicators is provided with a cam member 50 rotatable therewith and provided with two nodes 52 for engagement with a pin 54 on a tripping pawl 56 associated therewith. The pawl associated with the cost indicator 46 is pivotally supported at 58 on a bell crank 60 supported at 62 on the register casing. A spring 64 secured to the pawl tends to hold the same in the position shown in full lines in the drawing when the bell crank 60 is in the position also indicated in full lines. The free end of the pawl 56 is then below the adjacent end of a tripping member 66 but out of engagement therewith. The upper tripping member 66 is held against downward movement by a stop pin 68 and is connected to the lower tripping member 40 by a link 70. The pawl 56 associated with the lower indicator 48 is similarly supported at 72 by a bell crank 74, whereas the free end of the pawl extends into a position adjacent the lower tripping member.

Each of the bell cranks 60 and 74 is provided with a roller 76 bearing against a control slide 78 provided with recesses 80 and 82 in the surface thereof. The recesses 80 and 82 in the slide are spaced unequal distances from the rollers 76 on the bell cranks 60 and 74 and rest on the face of the slide when the slide is in the raised position shown. A spring 84 surrounding an operating rod 86 and extending between the lower end of slide 78 and the inner wall of the register housing urges the slide upwardly. However, the slide is movable downwardly against the action of spring 84 by means of a suitable selecting device 88 which is movable to any one of a plurality of positions to select the element of the register to be used in determining the operation of the cut off valve 14. The selector may be suitably constructed and arranged in any position or location convenient to the operator. Thus, while the selector may be mounted on the hose nozzle as illustrated in Fig. 2, for example, it is shown in Fig. 1 as located on the meter casing 2.

When in the position illustrated in full lines in Fig. 1 the selector 88 serves to maintain the tripping slide in its raised position in which the cut off valve is not actuated by the registering mechanism. The valve 14 is then held open and the dispensing operations carried on independently thereof. When the selector is moved to a vertical position link 90 is moved to the right and bell crank 92 is rocked about its pivot drawing the operating rod 86 and control slide 78 downwardly against the action of spring 84. The roller 76 on bell crank 74 then moves into the recess 82 due to the action of the spring 64 rocking the bell crank 74 about its pivot and moving the tripping pawl 56 into a position in which the free end thereof lies beneath the end of tripping member 40. The positions of the parts when the pawl 56 is thus moved are indicated by the dotted line position of the upper pawl 56 which operates in the same manner.

Movement of the selector 88 to an extreme left hand position, as shown in the drawing, serves to depress the slide 78 further moving the roller 76 on bell crank 74 out of the recess 82 and withdrawing the pawl 56 from beneath the tripping member 40. At the same time the roller 76 on the bell crank 60 enters the recess 80 and the pawl 56 associated therewith is thus caused to move beneath the tripping member 66 associated with the indicator 46 which indicates the price of the liquid dispensed.

The selector 88 and slide 78 are thus caused to render either one of the number wheels and connected cams operative to actuate the tripping member associated therewith. The operation of the valve 14 to terminate delivery of liquid therefore takes place upon rotation of the cam 50 associated with whichever indicator is selected and upon movement of one of the nodes 52 thereon into engagement with the pin 54 on pawl 56 to raise the pawl and that tripping member beneath which the pawl has been moved by operation of the selector. The link 70 connecting the tripping members 40 and 66 serves to raise both tripping members upon operation of either one, thereby insuring release of the latch 32 from bar 28 when either tripping member is actuated.

Since operation of valve 14 takes place automatically, and while the hand operated valve on hose nozzle 12 is held open by the operator, it is desirable to provide a check valve 94 in the dispensing hose or nozzle to prevent draining of the hose after flow of liquid has been cut off by the valve 14. Inaccurate delivery or loss to the patron due to refilling of the hose in each operation is thus avoided even though the hand operated valve is held open after the dispensing operation is completed.

In the operation of the construction described the hose 10 is removed from the supporting pivoted lever 20 and the outer end of the lever is raised depressing the inner end thereof so that switch 23 is operated to start the motor operated pump for delivery of liquid. The operating arm 18 is also rocked to open the valve 14 and raise the rod 28 so that the latch 32 may enter the recess 30 therein and hold the valve in opened position.

Thereafter in the delivery of liquid the meter 4 is actuated, driving the register through gears 44, causing the cost indicator 46 and the volume indicator 48 to be rotated. The cam members 50 associated with these indicators are rotated at the same time and the nodes 52 thereon engage the pins 54 on the tripping pawls 56, raising the same as the cam members rotate. However the pawls are free to move without actuating the tripping members 40 and 66 until they are moved by operation of the selector 88 and control slide 78 to permit rocking of one or the other of the bell cranks 60 or 74 to project the tripping pawl associated therewith beneath the tripping member 40 or 66. If delivery of liquid is to be controlled only by the hand operated valve on the nozzle 12, the selector 88 is allowed to remain in the position illustrated in full lines and the slide 78 remains raised. The cut off valve then remains open or inoperative and may be held in this position throughout any number of dispensing operations, if desired.

When a patron wishes an exact amount, such as five gallons of gasoline, the delivery operation is started as before, but when the indicator on the register passes a predetermined figure, such as four and one-half gallons, the operator moves the selector 88 to a vertical position, causing the slide 78 to be lowered to allow the roller 76 on bellcrank 74 to enter the recess 82, thereby causing the tripping pawl 56 associated therewith to be moved beneath the tripping member 40 so that the next rotation of the node 52 on cam 50 into position to raise the tripping pawl will also cause the member 40 to be raised engaging the arm 38 on latch carrying link 34 to rock the latter about its pivot 36 and withdraws the latch 32 from recess 30 in rod 28. The valve 14, being of the spring loaded type, will then close automatically, terminating delivery of liquid in response to the movement of indicator 48 and upon delivery of the amount of liquid previously determined.

In the event the patron wishes to purchase an amount of gasoline or liquid having a given cost, say one dollar, the device is operated in the same way until the indicator 46 passes a predetermined amount, say ninety-five cents, and the selector is then moved to the extreme right hand position, as seen in the drawing. The slide 78 is then moved to its lowermost position, the roller 76 on bell crank 74 moving into and again out of recess 82 and the roller on bell crank 60 moving into recess 80. Thereafter upon rotation of a node 52 on the cam associated with indicator 46 into engagement with the pin 54 on tripping pawl 56, the tripping member 66 is raised. Link 70 connecting the members 66 and 40 causes the member 40 also to be raised and the arm 38 and latch carrying link 34 are thereby rotated to withdraw the latch 32 and permit closing of the valve 14. The amount of liquid delivered is thus controlled by operation of the cost indicator and flow is terminated by a predetermined setting of the mechanism.

The selector of Fig. 2 is similar in construction and operation to that of Fig. 1 but is carried by the hose nozzle 12 in a position convenient to the attendant's hand as he operates the nozzle valve. A flexible wire extends from the selector 88 along the outside of the hose 10 to the control slide 78 of Fig. 1 and serves to move the same to the position selected for actuating the cut off valve releasing mechanism in the manner described in connection with the construction of Fig. 1.

As illustrated in Fig. 1, the nodes 52 on cams 50 are fixed to the cam and spaced to raise the tripping pawls associated therewith on rotation of the indicators to represent each half gallon or each five cents. However, it will be obvious that the nodes may be arranged or spaced otherwise and that the cam numbers or nodes may be movable to effect the operation of the latch releasing mechanism at other intervals or in response to other movements of the indicator, as desired. It will also be evident that the arrangement, construction and location of the elements of the device may be varied to adapt the invention to any particular installation. It should therefore be understood that the form of the invention illustrated is intended to represent a typical embodiment thereof and is not intended to limit the scope of the invention.

I claim:

1. In a liquid dispensing device having a cut-off valve and latch means for retaining said valve in open position; the combination of a register comprising a pair of spaced, substantially parallel shafts adapted to actuate volume and cost indicators, respectively, each of said shafts being provided with a cam having dwells of a length corresponding to a predetermined movement of the respective indicator, latch releasing means associated with the cams of each indicator, and selector means including a shiftable member, elements actuatable by said cams in accordance to movement of the dwells thereof, and means associated with said shiftable member for selectively positioning said elements for actuating said latch releasing means at a predetermined volume or cost registration.

2. In a liquid dispensing device having a cut-off valve and latch means for retaining said valve in open position; the combination of a register comprising a pair of spaced, substantially parallel shafts adapted to actuate volume and cost indicators, respectively, each of said shafts being provided with a cam having dwells of a length corresponding to a predetermined movement of the respective indicator, latch releasing means associated with the cams of each indicator, and selector means including a shiftable member, an element adjacent each of said cams biased to engage the surface of said member, and the surface of said member being provided with irregularities for effecting selective movement of said elements into operative position with respect to their respective cams and said latch releasing means for actuation of said latch releasing means at a predetermined volume or cost registration.

3. In a liquid dispensing device having a cut-off valve and latch means for retaining said valve in open position; the combination of a register having a pair of spaced shafts adapted to actuate volume and cost indicators respectively, a cam carried by each of said shafts, latch releasing means located adjacent but out of reach of each of the cams, selector elements adapted to be engaged by said cams at predetermined positions of said volume and cost indicators, respectively, and a shiftable control member having parts adapted to effect selective movement of said elements to positions whereby said latch releasing means are actuated to release said cut-off valve at predetermined volume or cost registrations.

4. In a liquid dispensing device having a cut-off valve and latch means for retaining said valve in open position; the combination of a register having a pair of spaced shafts adapted to actuate volume and cost indicators respectively, a cam carried by each of said shafts, said latch means including parts located adjacent but out of reach of each of the cams, a selector element for each cam, said cams being shaped to effect tripping movement of the selector elements at predetermined readings of their respective indicators, said selector elements being shiftable into position adjacent said latch means to trip same when said element is moved by its respective cam, and control means adapted to effect selective movement of said elements.

CHARLES S. HAZARD.